(12) United States Patent
Ando et al.

(10) Patent No.: US 6,791,597 B2
(45) Date of Patent: Sep. 14, 2004

(54) VISUAL TELEPHONE UNIT AND VISUAL TELEPHONE SYSTEM THEREWITH

(75) Inventors: Takeshi Ando, Tokyo (JP); Masakatsu Takizawa, Tokyo (JP)

(73) Assignee: NEC Corporation, Tokyo (JP)

( * ) Notice: Subject to any disclaimer, the term of this patent is extended or adjusted under 35 U.S.C. 154(b) by 245 days.

(21) Appl. No.: 09/757,568

(22) Filed: Jan. 11, 2001

(65) Prior Publication Data

US 2001/0008412 A1 Jul. 19, 2001

(30) Foreign Application Priority Data

Jan. 17, 2000 (JP) ........................................ 2000-008160

(51) Int. Cl.[7] .................................................. H04N 7/14
(52) U.S. Cl. ................................ 348/14.02; 348/14.01; 348/14.05
(58) Field of Search ............................. 348/14.01, 14.02, 348/14.05, 14.08, 14.09, 14.1, 14.11, 14.12; 382/289, 297; H04N 7/14

(56) References Cited

U.S. PATENT DOCUMENTS 5,488,488 A * 1/1996 Shimizu ..................... 358/468

FOREIGN PATENT DOCUMENTS

| JP | H1-300789 | 12/1989 | | |
|---|---|---|---|---|
| JP | 402058484 A | * 2/1990 | ............ | H04N/7/14 |
| JP | 03-58589 | 3/1991 | | |
| JP | 04-105488 | 4/1992 | | |
| JP | 04-105489 | 4/1992 | | |
| JP | H5-268599 | 10/1993 | | |
| JP | 08-19004 | 1/1996 | | |
| JP | 08-256316 | 10/1996 | | |
| JP | 09-83981 | 3/1997 | | |
| JP | 11-3493 | 1/1999 | | |
| JP | H11-196397 | 7/1999 | | |
| JP | 11-203455 | 7/1999 | | |
| JP | 411205724 A | * 7/1999 | .......... | H04N/5/765 |

* cited by examiner

*Primary Examiner*—Melur Ramakrishnaiah
(74) *Attorney, Agent, or Firm*—Sughrue Mion, PLLC

(57) ABSTRACT

A visual telephone unit is disclosed, that comprises a first inputting portion for inputting a picture frame, a second inputting portion for inputting a compensation amount of a rotation angle of the picture frame around a perpendicular line that passes through the picture frame, and a rotating portion for rotating the picture frame by the compensation amount.

19 Claims, 10 Drawing Sheets

VISUAL TELEPHONE UNIT AND VISUAL TELEPHONE SYSTEM THEREWITH

BACKGROUND OF THE INVENTION

1. Field of the Invention

The present invention relates to a visual telephone unit for transmitting a digital picture signal of an input picture or receiving a digital picture signal from another visual telephone unit. The present invention also relates to a visual telephone system having such a visual telephone unit.

2. Description of the Prior Art

A visual telephone conference system that allows the users at remote locations to have a conference is known. The visual telephone conference system has visual telephone conference units that are disposed at designated conference points. The designated conference points are connected using for example an ISDN telephone line network or the like so that a digital picture signal and an audio signal are transmitted and received therebetween.

In recent years, as mobile communication units such as cellular phone units are becoming common and technological innovations allow the transmission band to widen, a visual telephone conference may be held using a mobile visual conference unit that is a cellular phone unit having a small photographing unit such as a CCD (Charge Coupled Device).

A visual telephone conference is performed using cellular phone units that are connected through an exchange and base stations so that a digital picture signal and an audio signal are transmitted and received therebetween.

FIG. 1 is a schematic diagram showing the structure of a visual telephone conference unit that is structured as a cellular phone unit. Referring to FIG. 1, a visual telephone conference unit 901 comprises a picture input unit 902, a microphone 903, a liquid crystal display 904, and a speaker 905. The picture input unit 902 inputs a picture. The microphone 903 collects a voice. The liquid crystal display 904 displays a picture of a digital picture signal received from another visual telephone unit. The speaker 905 outputs a voice.

When the user uses the visual telephone conference unit 901, he or she often holds it with his or her hand or places it on a desk. The visual telephone conference unit 901 is placed in such a manner that the frame of the picture input unit 902 is placed sideways or lengthways corresponding to the shape of a photographing object.

However, in the conventional visual telephone conference system, a picture frame that is input from the picture input unit 902 of the transmission side visual telephone conference unit is directly transmitted to the reception side visual telephone visual telephone conference unit, the orientation of the reception side visual telephone conference unit should be matched with the orientation of the transmission side visual telephone conference unit.

Thus, when the user has to place the visual telephone conference unit on a disk that is inclined, the visual telephone conference unit is inclined against a photographing object. As a result, the reception side visual telephone conference unit displays an inclined picture. In such a case, it is necessary to hold the reception side visual telephone conference unit in the inclined state. Thus, the operation of the reception side visual telephone conference unit is inconvenient.

SUMMARY OF THE INVENTION

The present invention is made from the above-described point of view. An object of the present invention is to provide a visual telephone conference system that does not need to adjust the orientation of a reception side visual telephone conference unit corresponding to the orientation of a transmission side visual telephone conference unit.

According to a first aspect of the present invention, there is provided a visual telephone unit, comprising: first inputting means for inputting a picture frame; second inputting means for inputting a compensation amount of a rotation angle of the picture frame around a perpendicular line that passes through the picture frame; and rotating means for rotating the picture frame by the compensation amount.

According to a second aspect of the present invention, there is provided a visual telephone unit, comprising: first inputting means for inputting a picture frame; second inputting means for inputting a compensation amount of a rotation angle of the picture frame around a perpendicular line that passes through the picture frame; and rotating means for rotating said first inputting means by the compensation amount.

According to a third aspect of the present invention, there is provided a visual telephone unit, comprising: first inputting means for inputting a picture frame; detecting means for detecting a rotation angle of the picture frame around a perpendicular line that passes through the picture frame against an upright picture thereof; and rotating means for rotating the picture frame so that the rotation angle becomes zero.

In visual telephone unit according to the third aspect, said detecting means may designate the angle made by the base of an inverse isosceles triangle formed by connecting both the eyes and the mouth of a face in a recognized picture and the horizontal line as the rotation angle.

The visual telephone unit according to the third aspect may further comprise: a head set having two speaker portions and a microphone portion each having a light source, wherein said detecting means designates the angle made by the base of an inverse isosceles triangle formed by connecting the light sources in the picture frame and the horizontal line as the rotation angle.

According to a fourth aspect of the present invention, there is provided a visual telephone unit, comprising: receiving means for receiving a picture frame; inputting means for inputting a compensation amount of a rotation angle of the picture frame around a perpendicular line that passes through the picture frame; and rotating means for rotating the picture frame by the compensation amount.

According to a fifth aspect of the present invention, there is provided a visual telephone unit, comprising: receiving means for receiving a picture frame; detecting means for detecting a rotation angle of the picture frame around a perpendicular line that passes through the picture frame against an upright picture thereof; and rotating means for rotating the picture frame so that the rotation angle becomes zero.

In the visual telephone unit according to the fifth aspect, said detecting means may designate the angle made by the base of an inverse isosceles triangle formed by connecting both the eyes and the mouth of a face in a recognized picture and the horizontal line as the rotation angle.

The visual telephone unit according to the fifth aspect may further comprise: a head set having two speaker portions and a microphone portion each having a light source, wherein said detecting means designates the angle made by the base of an inverse isosceles triangle formed by connecting the light sources in the picture frame and the horizontal line as the rotation angle.

According to a sixth aspect of the present invention, there is provided a visual telephone system having a first visual telephone unit and a second visual telephone unit; wherein the first visual telephone unit comprises: inputting means for inputting a picture frame; receiving means for receiving a compensation amount of a rotation angle of the picture frame around a perpendicular line that passes through the picture frame from the second visual telephone unit; and rotating means for rotating the picture frame by the compensation amount, and wherein the second visual telephone unit comprises: inputting means for inputting the compensation amount; and transmitting means for transmitting the compensation amount to the first visual telephone unit.

According to a seventh aspect of the present invention, there is provided a visual telephone system having a first visual telephone unit and a second visual telephone unit; wherein the first visual telephone unit comprises: inputting means for inputting a picture frame; receiving means for receiving a compensation amount of a rotation angle of the picture frame around a perpendicular line that passes through the picture frame from the second visual telephone unit; and rotating means for rotating said inputting means by the compensation amount, and wherein the second visual telephone unit comprises: inputting means for inputting the compensation amount; and transmitting means for transmitting the compensation amount to the first visual telephone unit.

According to a eighth aspect of the present invention, there is provided a visual telephone system having a first visual telephone unit and a second visual telephone unit; wherein the first visual telephone unit comprises: inputting means for inputting a picture frame; receiving means for receiving a rotation angle of the picture frame around a perpendicular line that passes through the picture frame against an upright picture thereof from the second visual telephone unit; and rotating means for rotating the picture frame so that the rotation angle becomes zero, and wherein the second visual telephone unit comprises: detecting means for detecting the rotation angle; and transmitting means for transmitting the rotation angle to the first visual telephone unit.

In the visual telephone system according to the eighth aspect, said detecting means may designate the angle made by the base of an inverse isosceles triangle formed by connecting both the eyes and the mouth of a face in a recognized picture and the horizontal line as the rotation angle.

The visual telephone system according to the eighth aspect may further comprise: a head set having two speaker portions and a microphone portion each having a light source, wherein said detecting means designates the angle made by the base of an inverse isosceles triangle formed by connecting the light sources in the picture frame and the horizontal line as the rotation angle.

According to a ninth aspect of the present invention, there is provided a visual telephone system having a first visual telephone unit and a second visual telephone unit; wherein the first visual telephone unit comprises: first inputting means for inputting a picture frame; second inputting means for inputting a compensation amount of a rotation angle of the picture frame around a perpendicular line that passes through the picture frame; and transmitting means for transmitting the compensation amount to the second visual telephone unit, and wherein the second visual telephone unit comprises: receiving means for receiving the compensation amount from the first visual telephone unit; and rotating means for rotating the picture frame by the compensation amount.

According to a tenth aspect of the present invention, there is provided a visual telephone system having a first visual telephone unit and a second visual telephone unit; wherein the first visual telephone unit comprises: inputting means for inputting a picture frame; detecting means for detecting a rotation angle of the picture frame around a perpendicular line that passes through the picture frame against an upright picture thereof; and transmitting means for transmitting the rotation angle to the second visual telephone unit, and wherein the second television unit comprises: receiving means for receiving the rotation angle from the first visual telephone unit; and rotating means for rotating the picture frame so that the rotation angle becomes zero.

In the visual telephone system according to the tenth aspect, detecting means may designate the angle made by the base of an inverse isosceles triangle formed by connecting both the eyes and the mouth of a face of a recognized picture and the horizontal line as the rotation angle.

The visual telephone system according to the tenth aspect may further comprise: a head set having two speaker portions and a microphone portion each having a light source, wherein said detecting means designates the angle made by the base of an inverse isosceles triangle formed by connecting the light sources of the picture frame and the horizontal line as the rotation angle.

These and other objects, features and advantages of the present invention will become more apparent in light of the following detailed description of a best mode embodiment thereof, as illustrated in the accompanying drawings.

DESCRIPTION OF PREFERRED EMBODIMENTS

Next, with reference to the accompanying drawings, embodiments of the present invention will be described.

Figure 1:
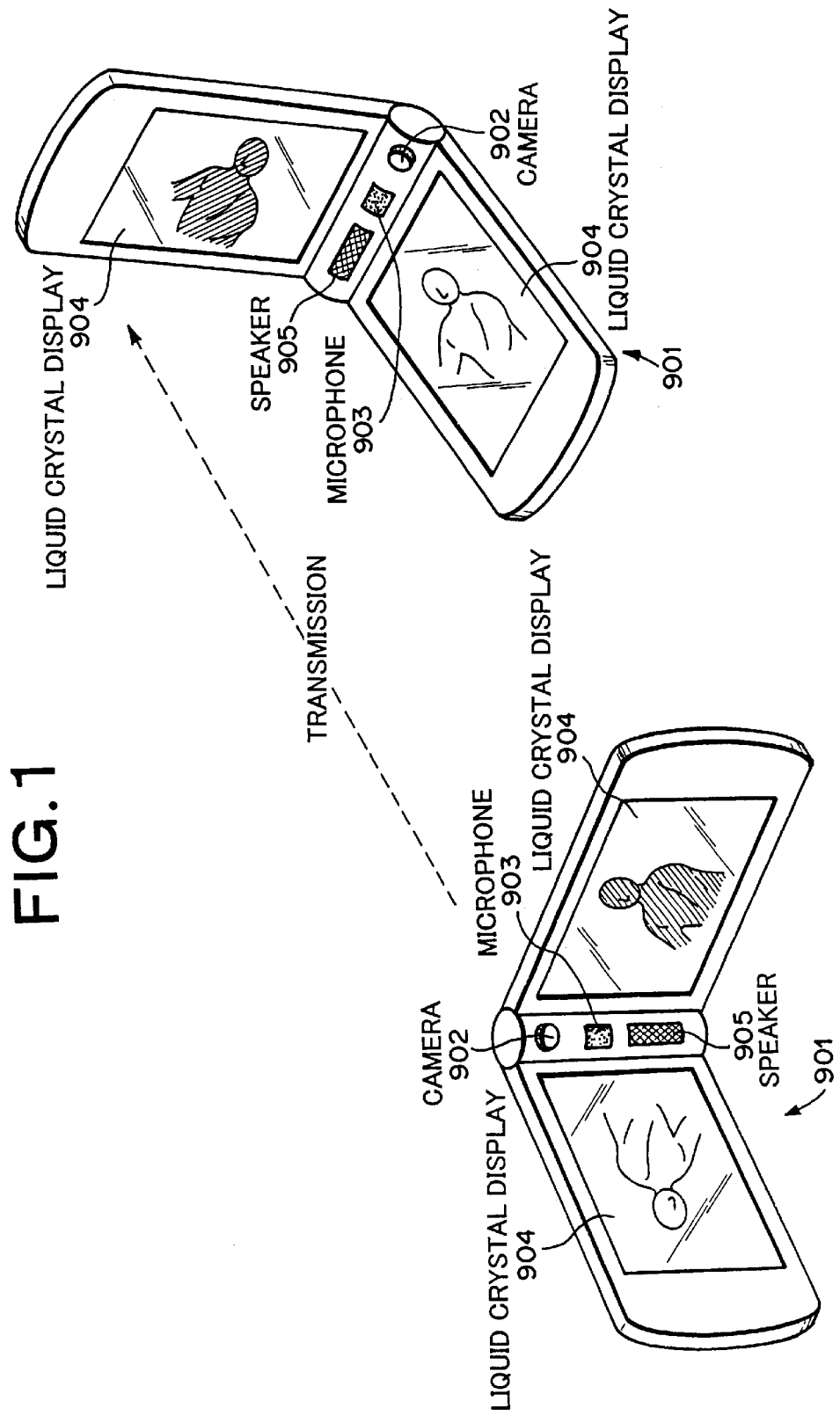
FIG. 1 is a schematic diagram showing an external view of a conventional visual telephone conference system.
Figure 2:
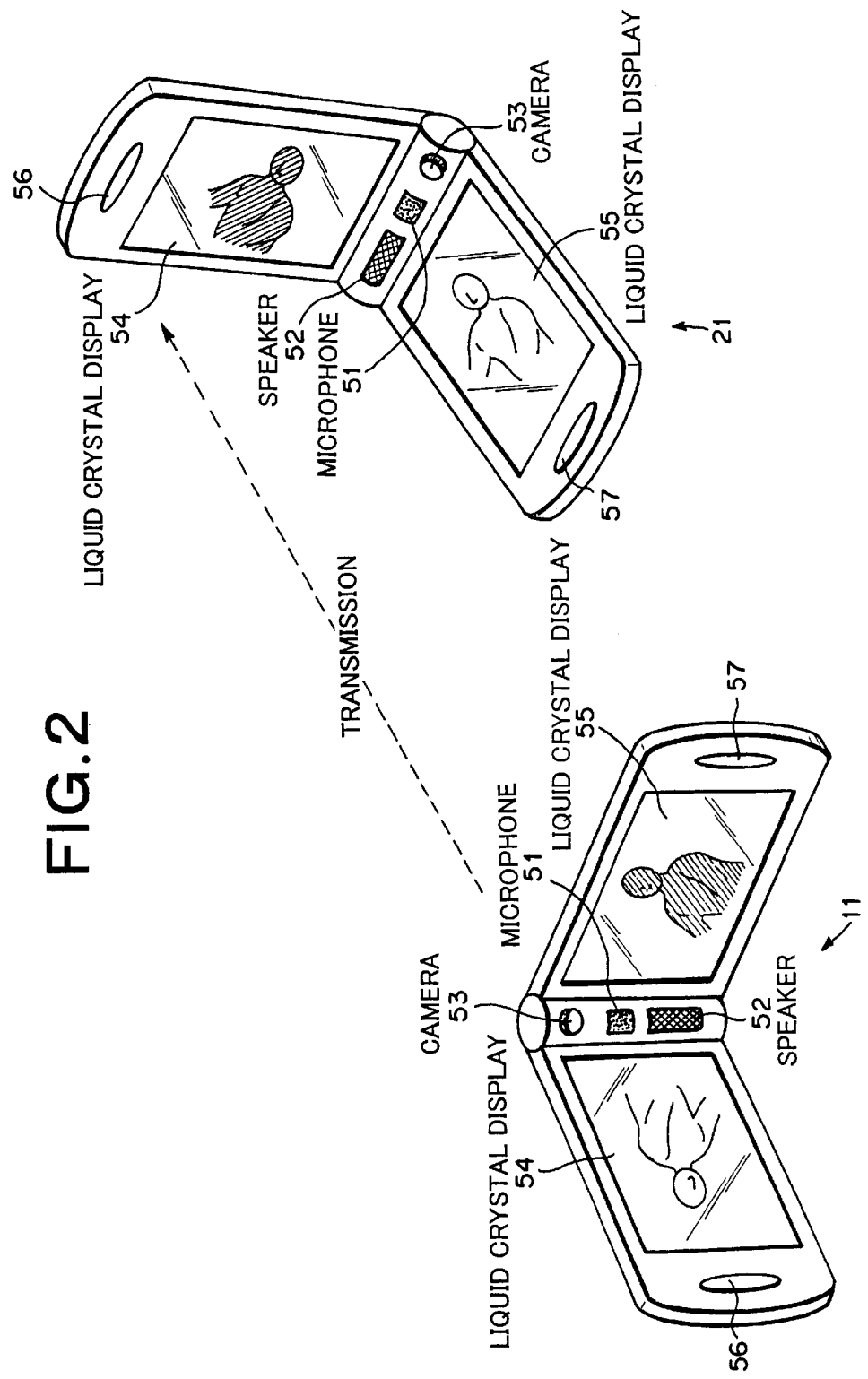
FIG. 2 is a schematic diagram showing an external view of a visual telephone conference system according to each of embodiments of the present invention.

FIG. 2 is a schematic diagram showing the structure of a visual telephone conference system according to each of embodiments of the present invention.

Referring to FIG. 2, the visual telephone conference system comprises a transmission side visual telephone conference unit 11 and a reception side visual telephone conference unit 21. Hereinafter, the transmission side visual telephone conference unit 11 and the reception side visual telephone conference unit 21 are referred to as transmission side unit and reception side unit, respectively. The transmission side unit 11 has a receiving function of the reception side unit 21 as well as a transmitting function of the transmission side visual telephone conference unit. Likewise, the reception side unit 21 has a transmitting function of the transmission side unit 11 as well as a receiving function of the reception side visual telephone conference unit. The structure of the transmission side unit 11 is the same as the structure of the reception side unit 21. In the following description, it is assumed that the transmission side unit 11 has only the transmitting function and that the reception side unit 21 has only the receiving function.

Each of the transmission side unit 11 and the reception side unit 21 has a user interface that comprises a microphone 51, a speaker 52, a camera 53, a liquid crystal display 54, a liquid crystal display 55, a button (or dial) 56, and a button (or dial) 57. The microphone 51 inputs a voice of the local user. The speaker 52 outputs a voice of the remote user. The camera 53 photographs a picture of the upper half of the body of the local user. The liquid crystal display 54 displays a picture of the upper half of the body of the local user including the face of the user photographed by the camera 53. The liquid crystal display 55 displays a picture of the upper half of the body including the face of the remote user. The button (or dial) 56 allows the user to input a command for causing the picture frame photographed by the camera 53 to be rotated around the perpendicular line that passes through the picture frame. The button (or dial) 57 allows the user to input a command for causing the picture frame photographed by the remote picture input unit to be rotated around the perpendicular line that passes through the picture frame.

First Embodiment

According to the first embodiment of the present invention, the rotation angle of the picture frame around the perpendicular line that passes through the picture frame is compensated by a signal process of a rotation processing portion of the transmission side unit 11 by the amount of the manual operation of the transmission side unit 11.

Figure 3:
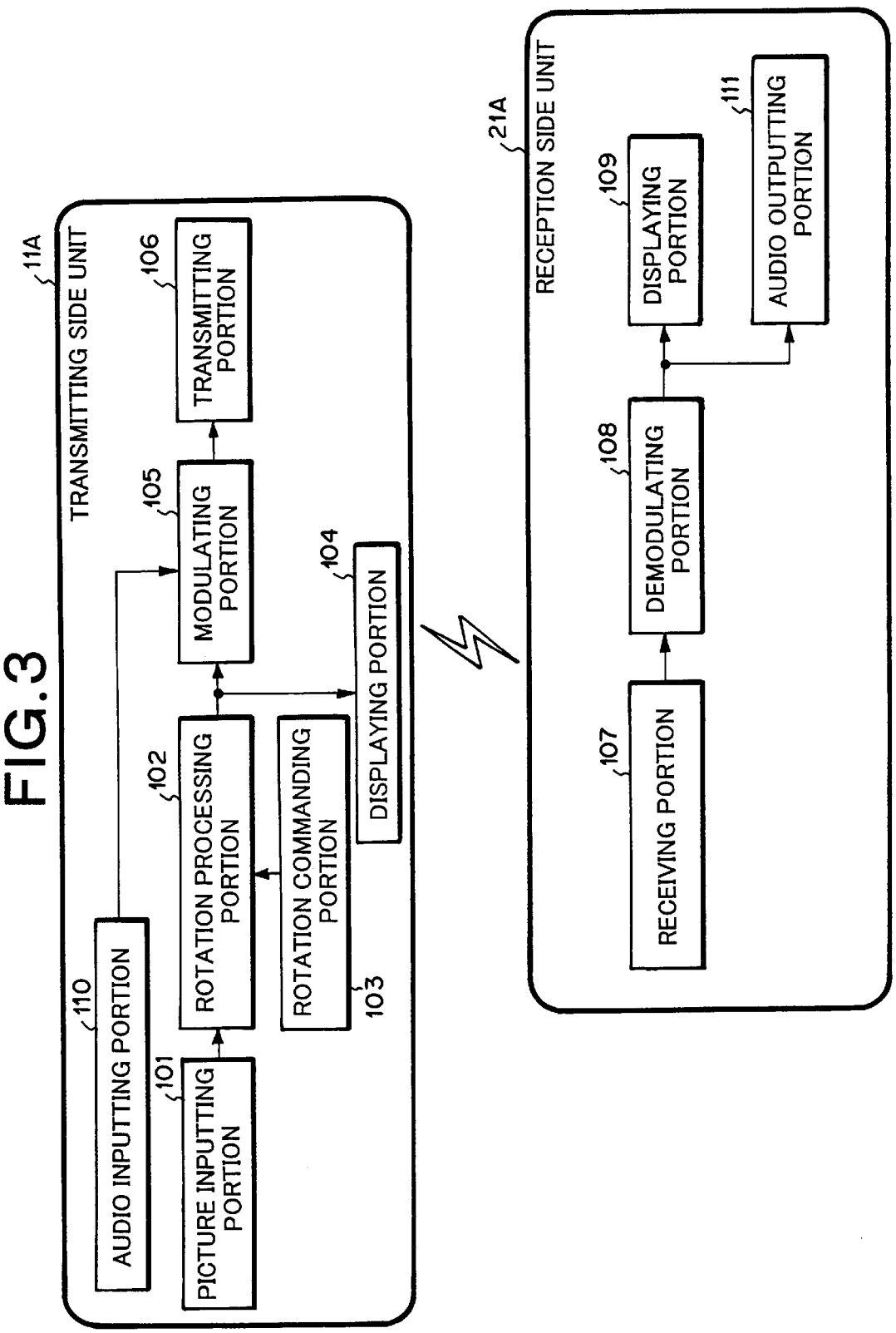
FIG. 3 is a block diagram showing the internal structure of a visual telephone conference system according to a first embodiment of the present invention.

FIG. 3 is a block diagram showing the internal structure of a visual telephone conference system according to the first embodiment of the present invention. The visual telephone conference system according to the first embodiment comprises a transmission side unit 11A as the transmission side unit 11 and a reception side unit 21A as the reception side unit 21.

The transmission side unit 11A comprises an audio inputting portion 110, a picture inputting portion 101, a rotation processing portion 102, a rotation commanding portion 103, a displaying portion 104, a modulating portion 105, and a transmitting portion 106. The reception side unit 21A comprises a receiving portion 107, a demodulating portion 108, a displaying portion 109, and an audio outputting portion 111.

The audio inputting portion 110 comprises a microphone 51, an amplifier, and an A/D converter. The audio inputting portion 110 inputs a voice and outputs an digital audio signal of the voice to the modulating portion 105. The audio inputting portion 110 may further comprise a compressing portion that compresses the digital audio signal.

The picture inputting portion 101 comprises a camera 53, an amplifier, and an A/D converter. The picture inputting portion 101 inputs a picture and outputs a digital picture signal of the picture to the rotation processing portion 102.

The rotation processing portion 102 comprises a frame memory and a rotating circuit. The digital signal that is input from the picture inputting portion 101 is stored to the frame memory. The digital picture signal stored in the frame memory is compensated by the rotating circuit corresponding to a command signal received from the rotation commanding portion 103 so that the picture frame is rotated. The compensated digital picture signal is output to the displaying portion 104 and the modulating portion 105. The rotating circuit may be composed of a CPU or a DSP.

The rotation commanding portion 103 comprises a converter that converts an amount of the operation of the button (or dial) 56 into an electric signal. The rotation commanding portion 103 receives a rotation command from the user and outputs a command signal of the rotation command to the rotation processing portion 102.

The displaying portion 104 comprises a D/A converter, a liquid crystal display driver, and a liquid crystal display 54. The displaying portion 104 displays a picture frame that is input from the picture inputting portion 101.

The modulating portion 105 modulates the digital audio signal that is input from the audio inputting portion 110 and the digital picture signal that is input from the rotation processing portion 102 corresponding to a predetermined modulating system and outputs the modulated digital audio signal and digital picture signal to the transmitting portion 106.

The transmitting portion 106 comprises an amplifier and an antenna. The transmitting portion 106 amplifies the modulated digital audio signal and digital picture signal that are input from the modulating portion 105 and transmits the amplified signals as a radio signal to a base station (not shown) that manages the transmission side unit 11A. The radio signal that is received by the base station is transmitted to the reception side unit 21A through an exchange station and the base station that manages the reception side unit 21A.

The receiving portion 107 comprises an antenna and an amplifier. The receiving portion 107 receives the radio signal that is transmitted from the transmission side unit 11A and outputs modulated digital audio signal and digital picture signal to the demodulating portion 108.

The demodulating portion 108 demodulates the modulated digital audio signal and digital picture signal that are input from the receiving portion 107 and outputs demodulated digital audio signal and digital picture signal to the audio outputting portion 111 and the displaying portion 109, respectively.

The displaying portion 109 comprises a D/A converter, a liquid crystal display driver, and a liquid crystal display 55. The picture inputting portion 101 inputs the digital picture signal from the demodulating portion 108. When necessary, the displaying portion 109 displays a picture frame whose rotation angle is compensated around the perpendicular line that passes through the picture frame by the rotation processing portion 102.

The audio outputting portion 111 comprises a D/A converter, an amplifier, and a speaker 52. The audio outputting portion 111 outputs a voice that is input from the audio inputting portion 110 corresponding to a digital audio signal that is input from the demodulating portion 108.

Next, the compensation of the rotation angle of a picture frame around the perpendicular line that passes through the picture frame will be described.

When the rotation commanding portion 103 does not send a rotation command to the rotation processing portion 102, the rotation processing portion 102 does not compensate the rotation of the picture frame of the digital picture signal. At that point, the displaying portion 104 displays a picture frame that is not compensated.

When the user of the transmission side unit 11A wants to rotate the picture frame displayed on the displaying portion 104, he or she operates the button (or dial) 56 of the transmission side unit 11A.

When the rotation processing portion 102 compensates the picture frame through the rotation commanding portion 103 corresponding to the user's operation, the picture frame displayed on the displaying portion 104 is rotated.

When the user wants to further compensate the rotated picture frame with reference to the rotated picture frame, he or she further operates the button (or dial) 56 of the transmission side unit 11A. When the member represented by reference 56 is a button, it has a right turning button and a left turning button. Whenever the right turning button is pressed, the picture frame is rotated rightward by a predetermined angle. Likewise, whenever the left turning button is pressed, the picture frame is rotated leftward by a predetermined angle. When the member represented by reference 56 is a dial, the picture frame is rotated in proportion to the rotation angle of the dial.

In such a manner, the user operates the button (or dial) 56 of the transmission side unit 11A until the rotated picture frame orients upright. Finally, the digital picture signal of the resultant picture frame is output from the rotation processing portion 102.

The picture frame is rotated using the affine transformation. In the affine transformation, when the two-dimensional coordinate of a particular point that has not been rotated is denoted by (X, Y), the coordinate of the rotating axis is denoted by (A, B), and the rotation angle is denoted by θ, the two-dimensional coordinate of the point that has been rotated is expressed as follows:

$$X'=\cos\theta \times (X-A)+\sin\theta \times (Y-B)+A$$

$$Y'=-\sin\theta \times (X-A)+\cos\theta \times (Y-B)+B$$

The rotating circuit of the rotation processing portion 102 manipulates the addresses of the picture signal stored in the frame memory corresponding to the affine transformation. For example, the read addresses of the digital picture signal written in the frame memory are controlled corresponding to the above-described expressions.

The coordinate of the rotating axis (A, B) is set at the center point of the picture frame.

Second Embodiment

According to the second embodiment of the present invention, the rotation angle of the picture frame around the perpendicular line that passes through the picture frame is compensated by a signal process of a rotation processing portion of the reception side unit 21 by the amount of the manual operation of the reception side unit 21.

Figure 4:
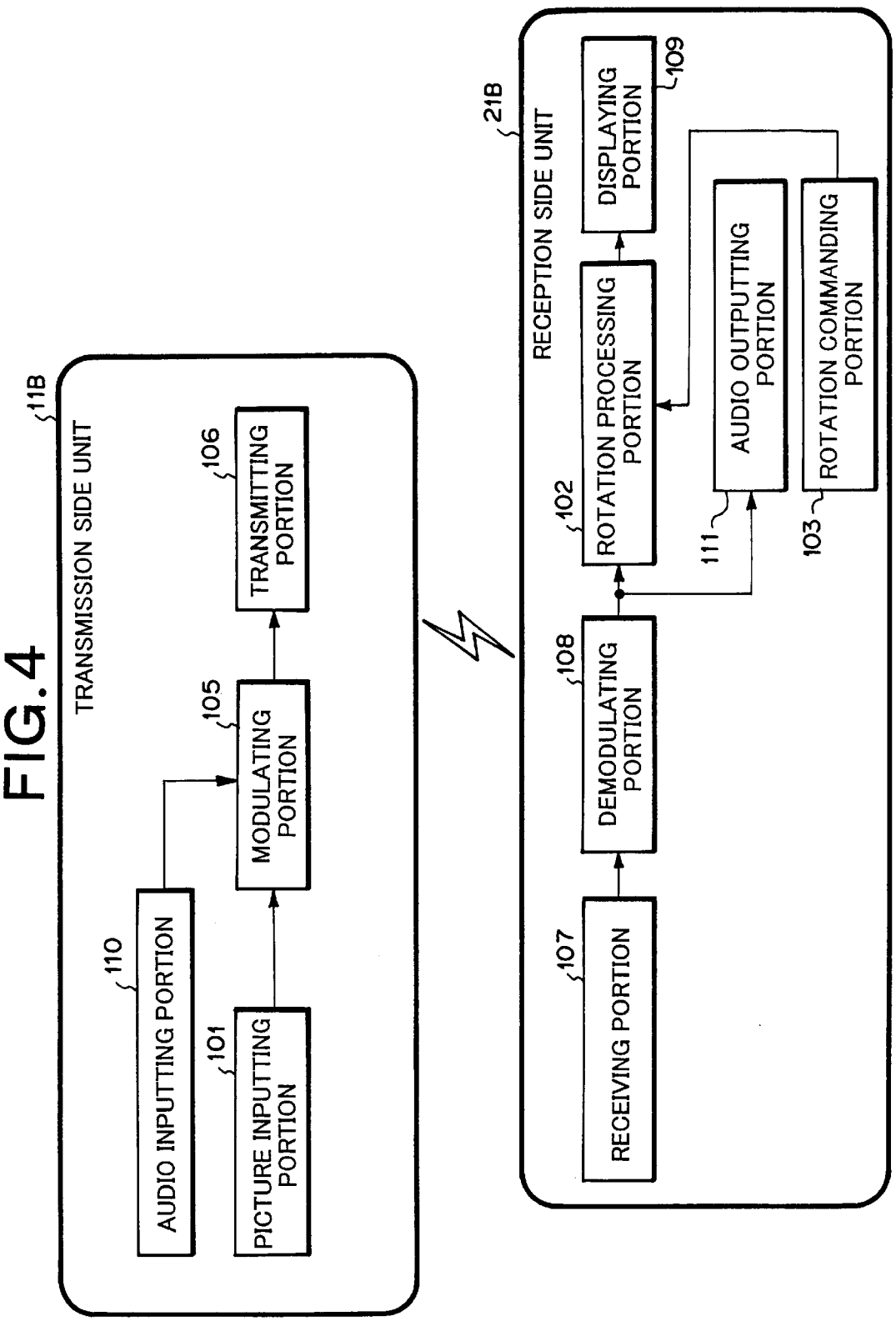
FIG. 4 is a block diagram showing the internal structure of a visual telephone conference system according to a second embodiment of the present invention.

FIG. 4 is a block diagram showing the internal structure of a visual telephone conference system according to the second embodiment of the present invention. The visual telephone conference system according to the second embodiment comprises a transmission side unit 11B as the transmission side unit 11 and a reception side unit 21B as the reception side unit 21.

The transmission side unit 11B comprises an audio inputting portion 110, a picture inputting portion 101, a modulating portion 105, and a transmitting portion 106. The reception side unit 21B comprises a rotation processing portion 102, a rotation commanding portion 103, a receiving portion 107, a demodulating portion 108, a displaying portion 109, and an audio outputting portion 111.

The audio inputting portion 110 comprises a microphone 51, an amplifier, and an A/D converter. The audio inputting portion 110 inputs a voice and outputs an digital audio signal of the voice to the modulating portion 105. The audio inputting portion 110 may further comprise a compressing portion that compresses the digital audio signal.

The picture inputting portion 101 comprises a camera inputting portion 53, an amplifier, and an A/D converter. The picture inputting portion 101 inputs a picture and outputs a digital picture signal of the picture to the modulating portion 105.

The modulating portion 105 modulates the digital audio signal that is input from the audio inputting portion 110 and the digital picture signal that is input from the picture inputting portion 101 corresponding to a predetermined modulating system and outputs the modulated digital audio signal and digital picture signal to the transmitting portion 106.

The transmitting portion 106 comprises an amplifier and an antenna. The transmitting portion 106 amplifies the modulated digital audio signal and digital picture signal that are input from the modulating portion 105 and transmits the amplified signals as a radio signal to a base station (not shown) that manages the transmission side unit 11B. The radio signal that is received by the base station is transmitted to the reception side unit 21B through an exchange and the base station that manages the reception side unit 21B.

The receiving portion 107 comprises an antenna and an amplifier. The receiving portion 107 receives the radio signal that is transmitted from the transmission side unit 11B and outputs modulated digital audio signal and digital picture signal to the demodulating portion 108.

The demodulating portion 108 demodulates the modulated digital audio signal and digital picture signal that are input from the receiving portion 107 and outputs demodulated digital audio signal and digital picture signal to the audio outputting portion 111 and the rotation processing portion 102, respectively.

The rotation processing portion 102 comprises a frame memory and a rotating circuit. The digital signal that is input from the demodulating portion 108 is stored to the frame memory. The digital picture signal stored in the frame memory is compensated by the rotating circuit corresponding to a command signal received from the rotation commanding portion 103 so that the picture frame is rotated. The compensated digital picture signal is output to the displaying portion 109. The rotating circuit may be composed of a CPU or a DSP.

The rotation commanding portion 103 comprises a converter that converts an amount of the operation of the button (or dial) 57 into an electric signal. The rotation commanding portion 103 receives a rotation command from the user and outputs a command signal of the rotation command to the rotation processing portion 102.

The displaying portion 109 comprises a D/A converter, a liquid crystal display driver, and a liquid crystal display 55. The picture inputting portion 101 inputs the digital picture signal from the rotation processing portion 102. When necessary, displaying portion 109 displays a picture frame whose rotation angle is compensated around the perpendicular line that passes through the picture frame by the rotation processing portion 102.

The audio outputting portion 111 comprises a D/A converter, an amplifier, and a speaker 52. The audio outputting portion 111 outputs a voice that is input from the audio inputting portion 110 corresponding to a digital audio signal that is input from the demodulating portion 108.

Next, the compensation of the rotation angle of a picture frame around the perpendicular line that passes through the picture frame will be described.

When the rotation commanding portion 103 does not send a rotation command to the rotation processing portion 102, the rotation processing portion 102 does not compensate the rotation of the picture frame of the digital picture signal. At that point, the displaying portion 109 displays a picture frame that is not compensated.

When the user of the reception side unit 21B wants to rotate the picture frame displayed on the displaying portion 109, he or she operates the button (or dial) 57 of the reception side unit 21B.

When the rotation processing portion 102 compensates the picture frame through the rotation commanding portion 103 corresponding to the user's operation, the picture frame displayed on the displaying portion 109 is rotated.

When the user wants to further compensate the rotated picture frame with reference to the rotated picture frame, he or she further operates the button (or dial) 57 of the reception side unit 21B. When the member represented by reference 57 is a button, it has a right turning button and a left turning button. Whenever the right turning button is pressed, the picture frame is rotated rightward by a predetermined angle. Likewise, whenever the left turning button is pressed, the picture frame is rotated leftward by a predetermined angle. When the member represented by reference 57 is a dial, the picture frame is rotated in proportion to the rotation angle of the dial.

In such a manner, the user operates the button (or dial) 57 of the reception side unit 21B until the rotated picture frame orients upright. Finally, the digital picture signal of the resultant picture frame is output from the rotation processing portion 102.

The picture frame is rotated using the affine transformation. In the affine transformation, when the two-dimensional coordinate of a particular point that has not been rotated is denoted by (X, Y), the coordinate of the rotating axis is denoted by (A, B), and the rotation angle is denoted by θ, the two-dimensional coordinate of the point that has been rotated is expressed as follows:

$$X'=\cos\theta\times(X-A)+\sin\theta\times(Y-B)+A$$

$$Y'=-\sin\theta\times(X-A)+\cos\theta\times(Y-B)+B$$

The rotating circuit of the rotation processing portion 102 manipulates the addresses of the picture signal stored in the frame memory corresponding to the affine transformation. For example, the read addresses of the digital picture signal written in the frame memory are controlled corresponding to the above-described expressions.

The coordinate of the rotating axis (A, B) is set at the center point of the picture frame.

Third Embodiment

According to the third embodiment of the present invention, the rotation angle of the picture frame around the perpendicular line that passes through the picture frame is compensated by a signal process of a rotation processing portion of the transmission side unit 11 by the amount of the manual operation of the reception side unit 21.

Figure 5:
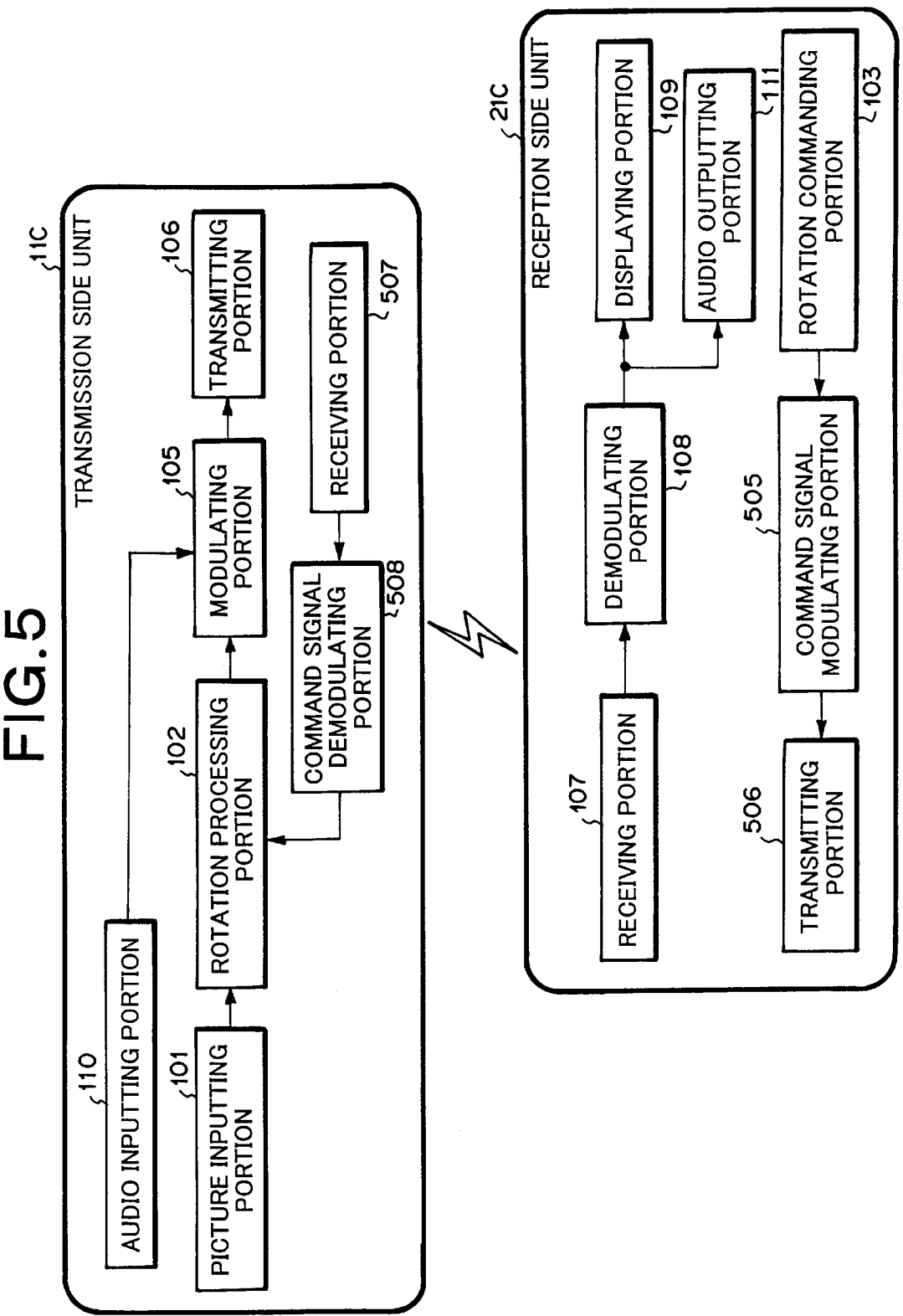
FIG. 5 is a block diagram showing the internal structure of a visual telephone conference system according to a third embodiment of the present invention.

FIG. 5 is a block diagram showing the internal structure of a visual telephone conference system according to the third embodiment of the present invention. The visual telephone conference system according to the third embodiment comprises a transmission side unit 11C as the transmission side unit 11 and a reception side unit 21C as the reception side unit 21.

The transmission side unit 11C comprises an audio inputting portion 110, a picture inputting portion 101, a rotation processing portion 102, a modulating portion 105, a transmitting portion 106, a receiving portion 507, and a command signal demodulating portion 508. The reception side unit 21C comprises a rotation commanding portion 103, a receiving portion 107, a demodulating portion 108, a displaying portion 109, an audio outputting portion 111, a command signal modulating portion 505, and a transmitting portion 506.

The audio inputting portion 110 comprises a microphone 51, an amplifier, and an A/D converter. The audio inputting portion 110 inputs a voice and outputs an digital audio signal of the voice to the modulating portion 105. The audio inputting portion 110 may further comprise a compressing portion that compresses the digital audio signal.

The picture inputting portion 101 comprises a camera 53, an amplifier, and an A/D converter. The picture inputting portion 101 inputs a picture and outputs a digital picture signal of the picture to the modulating portion 105.

The rotation processing portion 102 comprises a frame memory and a rotating circuit. The digital signal that is input from the picture inputting portion 101 is stored to the frame memory. The digital picture signal stored in the frame memory is compensated by the rotating circuit corresponding to a command signal received from the command signal demodulating portion 508 so that the picture frame is rotated. The compensated digital picture signal is output to the modulating portion 105. The rotating circuit may be composed of a CPU or a DSP.

The modulating portion 105 modulates the digital audio signal that is input from the audio inputting portion 110 and the digital picture signal that is input from the rotation processing portion 102 corresponding to a predetermined modulating system and outputs the modulated digital audio signal and digital picture signal to the transmitting portion 106.

The transmitting portion 106 comprises an amplifier and an antenna. The transmitting portion 106 amplifies the modulated digital audio signal and digital picture signal that are input from the modulating portion 105 and transmits the amplified signals as a radio signal to a base station (not shown) that manages the transmission side unit 11C. The radio signal that is received by the base station is transmitted to the reception side unit 21C through an exchange and the base station that manages the reception side unit 21C.

The receiving portion 107 comprises an antenna and an amplifier. The receiving portion 107 receives the radio signal that is transmitted from the transmission side unit 11C and outputs modulated digital audio signal and digital picture signal to the demodulating portion 108.

The demodulating portion 108 demodulates the modulated digital audio signal and digital picture signal that are input from the receiving portion 107 and outputs demodulated digital audio signal and digital picture signal to the audio outputting portion 111 and the displaying portion 109, respectively.

The displaying portion 109 comprises a D/A converter, a liquid crystal display driver, and a liquid crystal display 55. The picture inputting portion 101 inputs the digital picture signal from the demodulating portion 108. When necessary, the displaying portion 109 displays a picture frame whose rotation angle is compensated around the perpendicular line that passes through the picture frame by the rotation processing portion 102.

The audio outputting portion 111 comprises a D/A converter, an amplifier, and a speaker 52. The audio outputting portion 111 outputs a voice that is input from the audio inputting portion 110 corresponding to a digital audio signal that is input from the demodulating portion 108.

The rotation commanding portion 103 comprises a converter that converts an amount of the operation of the button (or dial) 57 into an electric signal. The rotation commanding portion 103 receives a rotation command from the user and outputs a command signal of the rotation command to the command signal modulating portion 505.

The command signal modulating portion 505 modulates the command signal that is input from the rotation commanding portion 103 corresponding to a predetermined modulating system and outputs the modulated command signal to the transmitting portion 506.

The transmitting portion 506 comprises an amplifier and an antenna. The transmitting portion 506 amplifies the modulated command signal that is input from the command signal modulating portion 505 and transmits the amplified command signal as a radio signal to a base station (not shown) that manages the transmission side unit 21C. The radio signal that is received by the base station is transmitted to the transmission side unit 11C through an exchange and the base station that manages the transmission side unit 11C.

The receiving portion 507 comprises an antenna and an amplifier. The receiving portion 507 receives the radio signal that is transmitted from the reception side unit 21C and outputs the modulated command signal to the command signal demodulating portion 508.

The command signal demodulating portion 508 demodulates the modulated command signal that is input from the receiving portion 507 and outputs demodulated command signal to the rotation processing portion 102.

Next, the compensation of the rotation angle of a picture frame around the perpendicular line that passes through the picture frame will be described.

When the rotation commanding portion 103 does not send a rotation command to the rotation processing portion 102, the rotation processing portion 102 does not compensate the rotation of the picture frame of the digital picture signal. At that point, the displaying portion 109 displays a picture frame that is not compensated.

When the user of the reception side unit 21C wants to rotate the picture frame displayed on the displaying portion 109, he or she operates the button (or dial) 57 of the reception side unit 21C.

When the rotation processing portion 102 receives the command signal corresponding to the user's operation through the rotation commanding portion 103, the command signal modulating portion 505, the transmitting portion 506, the receiving portion 507, and the command signal demodulating portion 508 and then the rotation processing portion 102 compensates the rotation of the picture frame, the picture frame displayed on the displaying portion 104 is rotated.

When the user wants to further compensate the rotated picture frame with reference to the rotated picture frame, he or she further operates the button (or dial) 57 of the reception side unit 21C. When the member represented by reference 57 is a button, it has a right turning button and a left turning button. Whenever the right turning button is pressed, the picture frame is rotated rightward by a predetermined angle. Likewise, whenever the left turning button is pressed, the picture frame is rotated leftward by a predetermined angle. When the member represented by reference 57 is a dial, the picture frame is rotated in proportion to the rotation angle of the dial.

In such a manner, the user operates the button (or dial) 57 of the reception side unit 21C until the rotated picture frame orients upright. Finally, the digital picture signal of the resultant picture frame is output from the rotation processing portion 102.

The picture frame is rotated using the affine transformation. In the affine transformation, when the two-dimensional coordinate of a particular point that has not been rotated is denoted by (X, Y), the coordinate of the rotating axis is denoted by (A, B), and the rotation angle is denoted by $\theta$, the two-dimensional coordinate of the point that has been rotated is expressed as follows:

$$X'=\cos\theta \times (X-A)+\sin\theta \times (Y-B)+A$$

$$Y'=-\sin\theta \times (X-A)+\cos\theta \times (Y-B)+B$$

The rotating circuit of the rotation processing portion 102 manipulates the addresses of the picture signal stored in the frame memory corresponding to the affine transformation. For example, the read addresses of the digital picture signal written in the frame memory are controlled corresponding to the above-described expressions.

The coordinate of the rotating axis (A, B) is set at the center point of the picture frame.

The compensation of the rotation angle of the picture frame around the perpendicular line that passes through the picture frame may be performed by a signal process of the rotation processing portion in the receiving side unit 21 by the amount of the manual operation in the transmission side unit 11.

Fourth Embodiment

According to the fourth embodiment of the present invention, the rotation angle of the picture frame around the perpendicular line that passes through the picture frame is compensated by rotating a picture inputting portion with an actuator of the transmission side unit 11 by the amount of the manual operation of the reception side unit 21.

Figure 6:
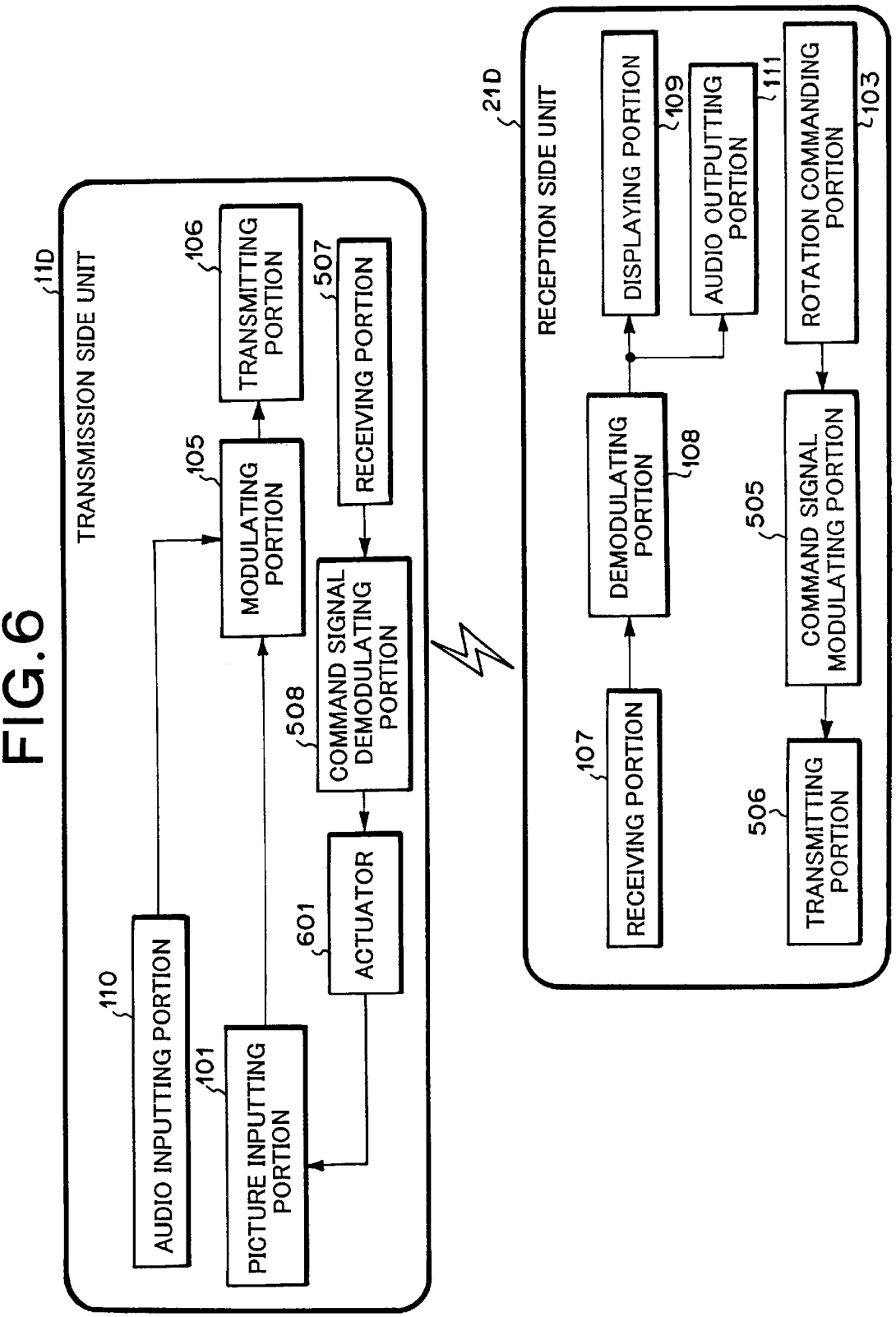
FIG. 6 is a block diagram showing the internal structure of a visual telephone conference system according to a fourth embodiment of the present invention.

FIG. 6 is a block diagram showing the internal structure of a visual telephone conference system according to the fourth embodiment of the present invention. The visual telephone conference system according to the fourth embodiment comprises a transmission side unit 11D as the transmission side unit 11 and a reception side unit 21D as the reception side unit 21.

The transmission side unit 11D comprises an audio inputting portion 110, a picture inputting portion 101, a modulating portion 105, a transmitting portion 106, a receiving portion 507, a command signal demodulating portion 508, and an actuator 601. The reception side unit 21D comprises a rotation commanding portion 103, a receiving portion 107, a demodulating portion 108, a displaying portion 109, an audio outputting portion 111, a command signal modulating portion 505, and a transmitting portion 506.

The audio inputting portion 110 comprises a microphone 51, an amplifier, and an A/D converter. The audio inputting portion 110 inputs a voice and outputs an digital audio signal of the voice to the modulating portion 105. The audio inputting portion 110 may further comprise a compressing portion that compresses the digital audio signal.

The picture inputting portion 101 comprises a camera 53, an amplifier, and an A/D converter. The picture inputting portion 101 inputs a picture and outputs a digital picture signal of the picture to the modulating portion 105.

The modulating portion 105 modulates the digital audio signal that is input from the audio inputting portion 110 and the digital picture signal that is input from the rotation processing portion 102 corresponding to a predetermined modulating system and outputs the modulated digital audio signal and digital picture signal to the transmitting portion 106.

The transmitting portion 106 comprises an amplifier and an antenna. The transmitting portion 106 amplifies the modulated digital audio signal and digital picture signal that are input from the modulating portion 105 and transmits the amplified signals as a radio signal to a base station (not shown) that manages the transmission side unit 11D. The radio signal that is received by the base station is transmitted to the reception side unit 21D through an exchange and the base station that manages the reception side unit 21D.

The receiving portion 107 comprises an antenna and an amplifier. The receiving portion 107 receives the radio signal that is transmitted from the transmission side unit 11D and outputs modulated digital audio signal and digital picture signal to the demodulating portion 108.

The demodulating portion 108 demodulates the modulated digital audio signal and digital picture signal that are input from the receiving portion 107 and outputs demodulated digital audio signal and digital picture signal to the audio outputting portion 111 and the displaying portion 109, respectively.

The displaying portion 109 comprises a D/A converter, a liquid crystal display driver, and a liquid crystal display 55. The picture inputting portion 101 inputs the digital picture signal from the demodulating portion 108. When necessary, the displaying portion 109 displays a picture frame whose rotation angle the actuator 601 compensates around the perpendicular line that passes through the picture frame.

The audio outputting portion 111 comprises a D/A converter, an amplifier, and a speaker 52. The audio outputting portion 111 outputs a voice that is input from the audio inputting portion 110 corresponding to a digital audio signal that is input from the demodulating portion 108.

The rotation commanding portion 103 comprises a converter that converts an amount of the operation of the button (or dial) 57 into an electric signal. The rotation commanding portion 103 receives a rotation command from the user and outputs a command signal of the rotation command to the command signal modulating portion 505.

The command signal modulating portion 505 modulates the command signal that is input from the rotation commanding portion 103 corresponding to a predetermined modulating system and outputs the modulated command signal to the transmitting portion 506.

The transmitting portion 506 comprises an amplifier and an antenna. The transmitting portion 506 amplifies the modulated command signal that is input from the command signal modulating portion 505 and transmits the amplified command signal as a radio signal to a base station (not shown) that manages the transmission side unit 21D. The radio signal that is received by the base station is transmitted to the transmission side unit 11D through an exchange and the base station that manages the transmission side unit 11D.

The receiving portion 507 comprises an antenna and an amplifier. The receiving portion 507 receives the radio signal that is transmitted from the reception side unit 21D and outputs the modulated command signal to the command signal demodulating portion 508.

The command signal demodulating portion 508 demodulates the modulated command signal that is input from the receiving portion 507 and outputs demodulated command signal to the actuator 601.

The actuator 601 comprises a motor such as a stepping motor. The camera 53 of the transmission side unit 11D is disposed on the rotor of the motor. The motor is rotated by an angle corresponding to the command signal. As a result, the camera 53 of the transmission side unit 11D disposed on the rotor is rotated by the angle corresponding to the command signal.

Next, the compensation of the rotation angle of a picture frame around the perpendicular line that passes through the picture frame will be described.

When the rotation commanding portion 103 does not send a rotation command to the actuator 601, it does not rotate the camera 53 of the transmission side unit 11D. Thus, the displaying portion 109 displays a picture frame that is not compensated.

When the user of the reception side unit 21D wants to rotate the picture frame displayed on the displaying portion 109, he or she operates the button (or dial) 57 of the reception side unit 21D.

When the actuator 601 receives the command signal corresponding to the user's operation through the rotation commanding portion 103, the command signal modulating portion 505, the transmitting portion 506, the receiving portion 507, and the command signal demodulating portion 508 and then the actuator 601 rotates the camera 53 of the transmission side unit 11D so as to rotate the picture frame, the picture frame displayed on the displaying portion 104 is rotated.

When the user wants to further compensate the rotated picture frame with reference to the rotated picture frame, he or she further operates the button (or dial) 57 of the reception side unit 21D. When the member represented by reference 57 is a button, it has a right turning button and a left turning button. Whenever the right turning button is pressed, the picture frame is rotated rightward by a predetermined angle. Likewise, whenever the left turning button is pressed, the picture frame is rotated leftward by a predetermined angle. When the member represented by reference 57 is a dial, the picture frame is rotated in proportion to the rotation angle of the dial.

In such a manner, the user operates the button (or dial) 57 of the reception side unit 21D until the rotated picture frame orients upright. Finally, the digital picture signal of the resultant picture frame is output from the picture inputting portion 101.

The actuator 601 may operate corresponding to a command signal received from the rotation commanding portion 103 in the transmission side unit 11D rather than the command signal received from the command signal demodulating portion 508.

Fifth Embodiment

According to the fifth embodiment of the present invention, the rotation angle of the picture frame around the perpendicular line that passes through the picture frame is compensated by a signal process of a rotation processing portion of the transmission side unit 11 by the amount corresponding to an automatically recognized result of the transmission side unit 11.

Figure 7:
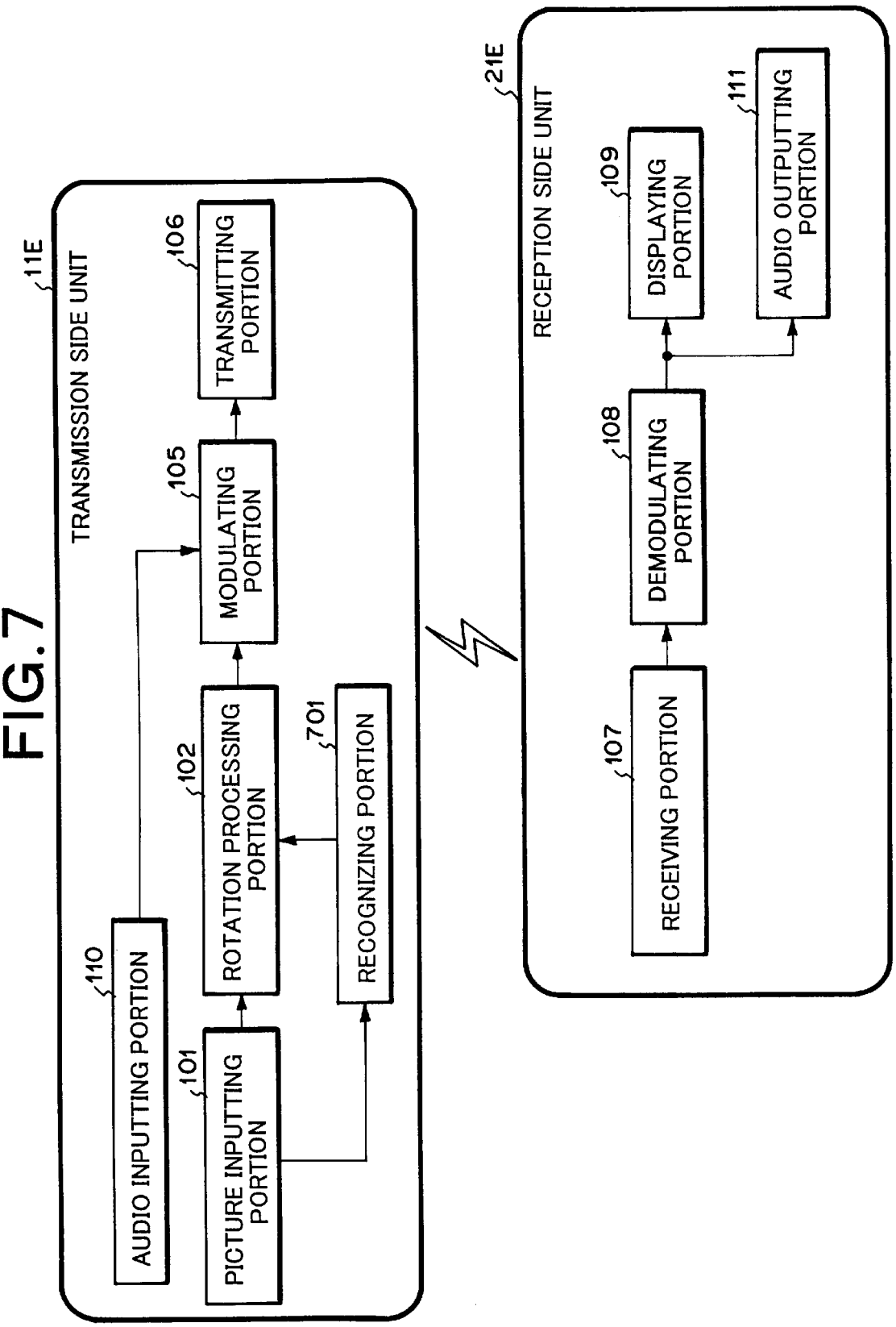
FIG. 7 is a block diagram showing the internal structure of a visual telephone conference system according to a fifth embodiment of the present invention.

FIG. 7 is a block diagram showing the internal structure of a visual telephone conference system according to the fifth embodiment of the present invention. The visual telephone conference system according to the fifth embodiment comprises a transmission side unit 11E as the transmission side unit 11 and a reception side unit 21E as the reception side unit 21.

The transmission side unit 11E comprises an audio inputting portion 110, a picture inputting portion 101, a rotation processing portion 102, a modulating portion 105, a transmitting portion 106, and a recognizing portion 701. The reception side unit 21E comprises a receiving portion 107, a demodulating portion 108, a displaying portion 109, and an audio outputting portion 111.

The audio inputting portion 110 comprises a microphone 51, an amplifier, and an A/D converter. The audio inputting portion 110 inputs a voice and outputs an digital audio signal of the voice to the modulating portion 105. The audio inputting portion 110 may further comprise a compressing portion that compresses the digital audio signal.

The picture inputting portion 101 comprises a camera 53, an amplifier, and an A/D converter. The picture inputting portion 101 inputs a picture and outputs a digital picture signal of the picture to the rotation processing portion 102 and the recognizing portion 701.

The recognizing portion 701 inputs the digital picture signal from the picture inputting portion 101, analyzes the digital picture signal, detects the rotation angle of the picture frame of the digital picture signal against an upright picture frame, and outputs a command signal corresponding to the rotation angle to the rotation processing portion 102. The rotation processing portion 102 rotates the picture frame so that the rotation angle represented by the command signal becomes zero.

The rotation processing portion 102 comprises a frame memory and a rotating circuit. The digital picture signal that is input from the picture inputting portion 101 is stored to the frame memory. The digital picture signal stored in the frame memory is compensated by the rotating circuit corresponding to a command signal received from the recognizing portion 701 so that the picture frame is rotated. The compensated digital picture signal is output to the modulating portion 105. The rotating circuit may be composed of a CPU or a DSP.

The modulating portion 105 modulates the digital audio signal that is input from the audio inputting portion 110 and the digital picture signal that is input from the rotation processing portion 102 corresponding to a predetermined modulating system and outputs the modulated digital audio signal and digital picture signal to the transmitting portion 106.

The transmitting portion 106 comprises an amplifier and an antenna. The transmitting portion 106 amplifies the modulated digital audio signal and digital picture signal that are input from the modulating portion 105 and transmits the amplified signals as a radio signal to a base station (not shown) that manages the transmission side unit 11E. The radio signal that is received by the base station is transmitted to the reception side unit 21E through an exchange and the base station that manages the reception side unit 21E.

The receiving portion 107 comprises an antenna and an amplifier. The receiving portion 107 receives the radio signal that is transmitted from the transmission side unit 11E and outputs modulated digital audio signal and digital picture signal to the demodulating portion 108.

The demodulating portion 108 demodulates the modulated digital audio signal and digital picture signal that are input from the receiving portion 107 and outputs demodulated digital audio signal and digital picture signal to the audio outputting portion 111 and the displaying portion 109, respectively.

The displaying portion 109 comprises a D/A converter, a liquid crystal display driver, and a liquid crystal display 55. The picture inputting portion 101 inputs the digital picture signal from the demodulating portion 108. When necessary, the displaying portion 109 displays a picture frame whose rotation angle is compensated around the perpendicular line that passes through the picture frame by the rotation processing portion 102.

The audio outputting portion 111 comprises a D/A converter, an amplifier, and a speaker 52. The audio outputting portion 111 outputs a voice that is input from the audio inputting portion 110 corresponding to a digital audio signal that is input from the demodulating portion 108.

Next, the detection of the rotation angle of the picture frame represented by the digital picture signal against the upright picture frame performed by the recognizing portion 701 will be described.

Since the picture frame contains a picture of a face, the angle of the picture of the face in the picture frame is detected. As a result, the rotation angle is detected. For example, an inverse isosceles triangle formed by both the eyes and the mouth of the face of the picture is extracted. The angle of the base of the inverse isosceles triangle against the horizontal line is defined as the rotation angle. Since the areas of the eyes move due to their blinking, such two areas are recognized as eye areas by a picture signal process. In addition, when a person speaks, the mouth moves more quickly and largely than other face portions. Thus, such an area is recognized as a mouth area by a picture signal process. The center points of the two eye areas and the mouth area are connected to form the inverse isosceles triangle.

The picture frame is rotated using the affine transformation. In the affine transformation, when the two-dimensional coordinate of a particular point that has not been rotated is denoted by (X, Y), the coordinate of the rotating axis is denoted by (A, B), and the rotation angle is denoted by θ, the two-dimensional coordinate of the point that has been rotated is expressed as follows:

$$X'=\cos\theta\times(X-A)+\sin\theta\times(Y-B)+A$$

$$Y'=-\sin\theta\times(X-A)+\cos\theta\times(Y-B)+B$$

The rotating circuit of the rotation processing portion 102 manipulates the addresses of the picture signal stored in the frame memory corresponding to the affine transformation. For example, the read addresses of the digital picture signal written in the frame memory are controlled corresponding to the above-described expressions.

The coordinate of the rotating axis (A, B) is set at the center point of the picture frame.

Sixth Embodiment

According to the sixth embodiment of the present invention, the rotation angle of the picture frame around the perpendicular line that passes through the picture frame is compensated by a signal process of a rotation processing portion of the reception side unit 21 by the amount corresponding to an automatically recognized result of the reception side unit 21.

Figure 8:
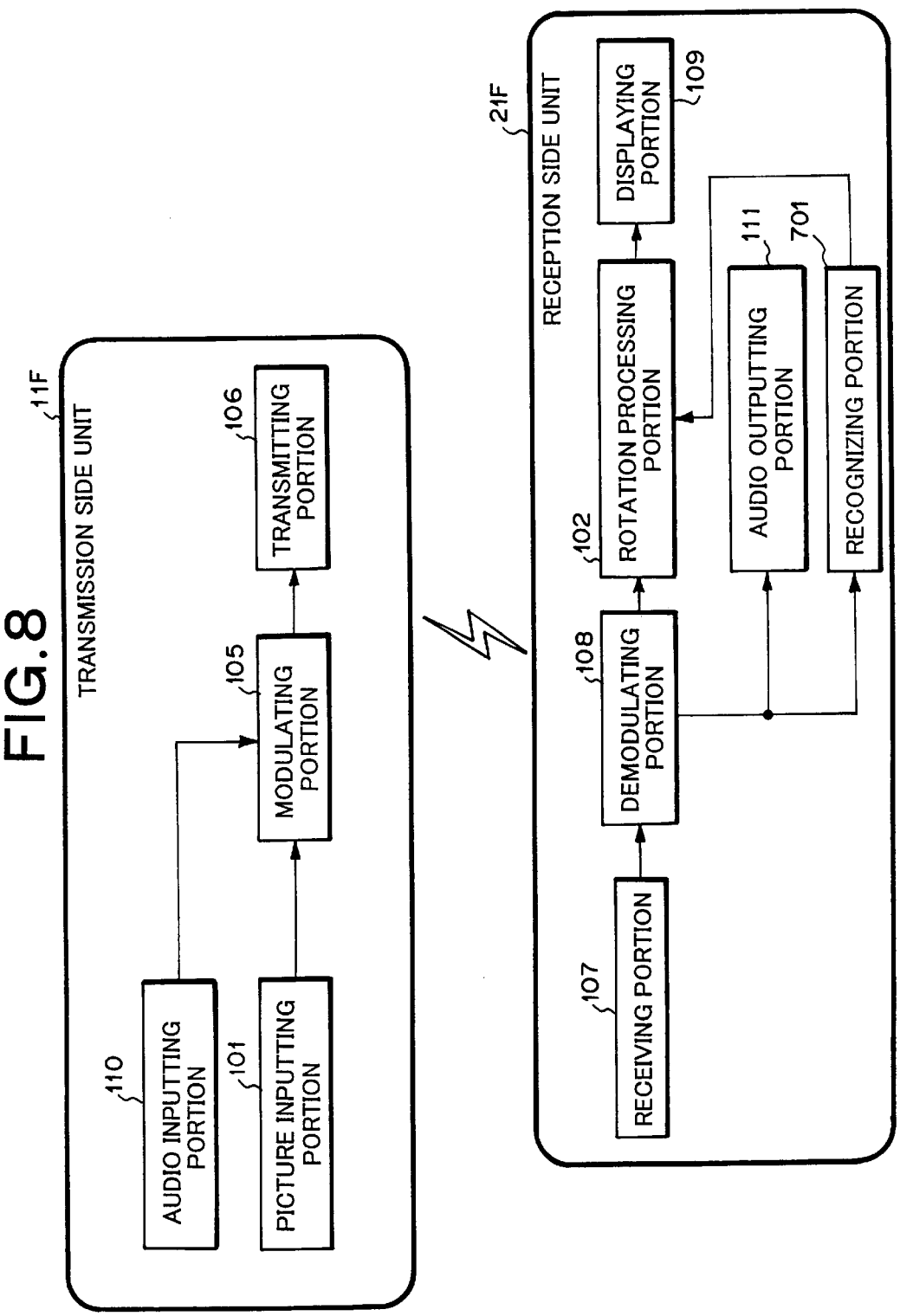
FIG. 8 is a block diagram showing the internal structure of a visual telephone conference system according to a sixth embodiment of the present invention.

FIG. 8 is a block diagram showing the internal structure of a visual telephone conference system according to the sixth embodiment of the present invention. The visual telephone conference system according to the sixth embodiment comprises a transmission side unit 11F as the transmission side unit 11 and a reception side unit 21F as the reception side unit 21.

The transmission side unit 11F comprises an audio inputting portion 110, a picture inputting portion 101, a modulating portion 105, and a transmitting portion 106. The reception side unit 21F comprises a rotation processing portion 102, a receiving portion 107, a demodulating portion 108, a displaying portion 109, an audio outputting portion 111, and a recognizing portion 701.

The audio inputting portion 110 comprises a microphone 51, an amplifier, and an A/D converter. The audio inputting portion 110 inputs a voice and outputs an digital audio signal of the voice to the modulating portion 105. The audio inputting portion 110 may further comprise a compressing portion that compresses the digital audio signal.

The picture inputting portion 101 comprises a camera 53, an amplifier, and an A/D converter. The picture inputting portion 101 inputs a picture and outputs a digital picture signal to the modulating portion 105.

The modulating portion 105 modulates the digital audio signal that is input from the audio inputting portion 110 and the digital picture signal that is input from the picture inputting portion 101 corresponding to a predetermined modulating system and outputs the modulated digital audio signal and digital picture signal to the transmitting portion 106.

The transmitting portion 106 comprises an amplifier and an antenna. The transmitting portion 106 amplifies the modulated digital audio signal and digital picture signal that are input from the modulating portion 105 and transmits the amplified signals as a radio signal to a base station (not shown) that manages the transmission side unit 11F. The radio signal that is received by the base station is transmitted to the reception side unit 21F through an exchange and the base station that manages the reception side unit 21F.

The receiving portion 107 comprises an antenna and an amplifier. The receiving portion 107 receives the radio signal that is transmitted from the transmission side unit 11F and outputs modulated digital audio signal and digital picture signal to the demodulating portion 108.

The demodulating portion 108 demodulates the modulated digital audio signal and digital picture signal that are input from the receiving portion 107. The demodulating portion 108 outputs a demodulated digital audio signal to the audio outputting portion 111. In addition, the demodulating portion 108 output a demodulated digital picture signal to the rotation processing portion 102 and the recognizing portion 701.

The audio outputting portion 111 comprises a D/A converter, an amplifier, and a speaker 52. The audio outputting portion 111 outputs a voice that is input from the audio inputting portion 110 corresponding to a digital audio signal that is input from the demodulating portion 108.

The recognizing portion 701 inputs the digital picture signal from the demodulating portion 108, analyzes the digital picture signal, detects the rotation angle of the picture frame of the digital picture signal against an upright picture frame, and outputs a command signal corresponding to the rotation angle to the rotation processing portion 102. The rotation processing portion 102 rotates the picture frame so that the rotation angle represented by the command signal becomes zero.

The rotation processing portion 102 comprises a frame memory and a rotating circuit. The digital picture signal that is input from the demodulating portion 108 is stored to the frame memory. The digital picture signal stored in the frame memory is compensated by the rotating circuit corresponding to a command signal received from the recognizing portion 701 so that the picture frame is rotated. The compensated digital picture signal is output to the displaying portion 109. The rotating circuit may be composed of a CPU or a DSP.

The displaying portion 109 comprises a D/A converter, a liquid crystal display driver, and a liquid crystal display 55.

The picture inputting portion 101 inputs the digital picture signal from the rotation processing portion 102. When necessary, the displaying portion 109 displays a picture frame whose rotation angle is compensated around the perpendicular line that passes through the picture frame by the rotation processing portion 102.

Next, the detection of the rotation angle of the picture frame represented by the digital picture signal against the upright picture frame performed by the recognizing portion 701 will be described.

Since the picture frame contains a picture of a face, the angle of the picture of the face in the picture frame is detected. As a result, the rotation angle is detected. For example, an inverse isosceles triangle formed by both the eyes and the mouth of the face of the picture is extracted. The angle of the base of the inverse isosceles triangle against the horizontal line is defined as the rotation angle. Since the areas of the eyes move due to their blinking, such two areas are recognized as eye areas by a picture signal process. In addition, when a person speaks, the mouth moves more quickly and largely than other face portions. Thus, such an area is recognized as a mouth area by a picture signal process. The center points of the two eye areas and the mouth area are connected to form the inverse isosceles triangle.

The picture frame is rotated using the affine transformation. In the affine transformation, when the two-dimensional coordinate of a particular point that has not been rotated is denoted by (X, Y), the coordinate of the rotating axis is denoted by (A, B), and the rotation angle is denoted by θ, the two-dimensional coordinate of the point that has been rotated is expressed as follows:

$$X' = \cos\theta \times (X-A) + \sin\theta \times (Y-B) + A$$

$$Y' = -\sin\theta \times (X-A) + \cos\theta \times (Y-B) + B$$

The rotating circuit of the rotation processing portion 102 manipulates the addresses of the picture signal stored in the frame memory corresponding to the affine transformation. For example, the read addresses of the digital picture signal written in the frame memory are controlled corresponding to the above-described expressions.

The coordinate of the rotating axis (A, B) is set at the center point of the picture frame.

Seventh Embodiment

According to the seventh embodiment of the present invention, the rotation angle of the picture frame around the perpendicular line that passes through the picture frame is compensated by a signal process of a rotation processing portion of the reception side unit 21 by the amount corresponding to an automatically recognized result of the transmission side unit 11.

Figure 9:
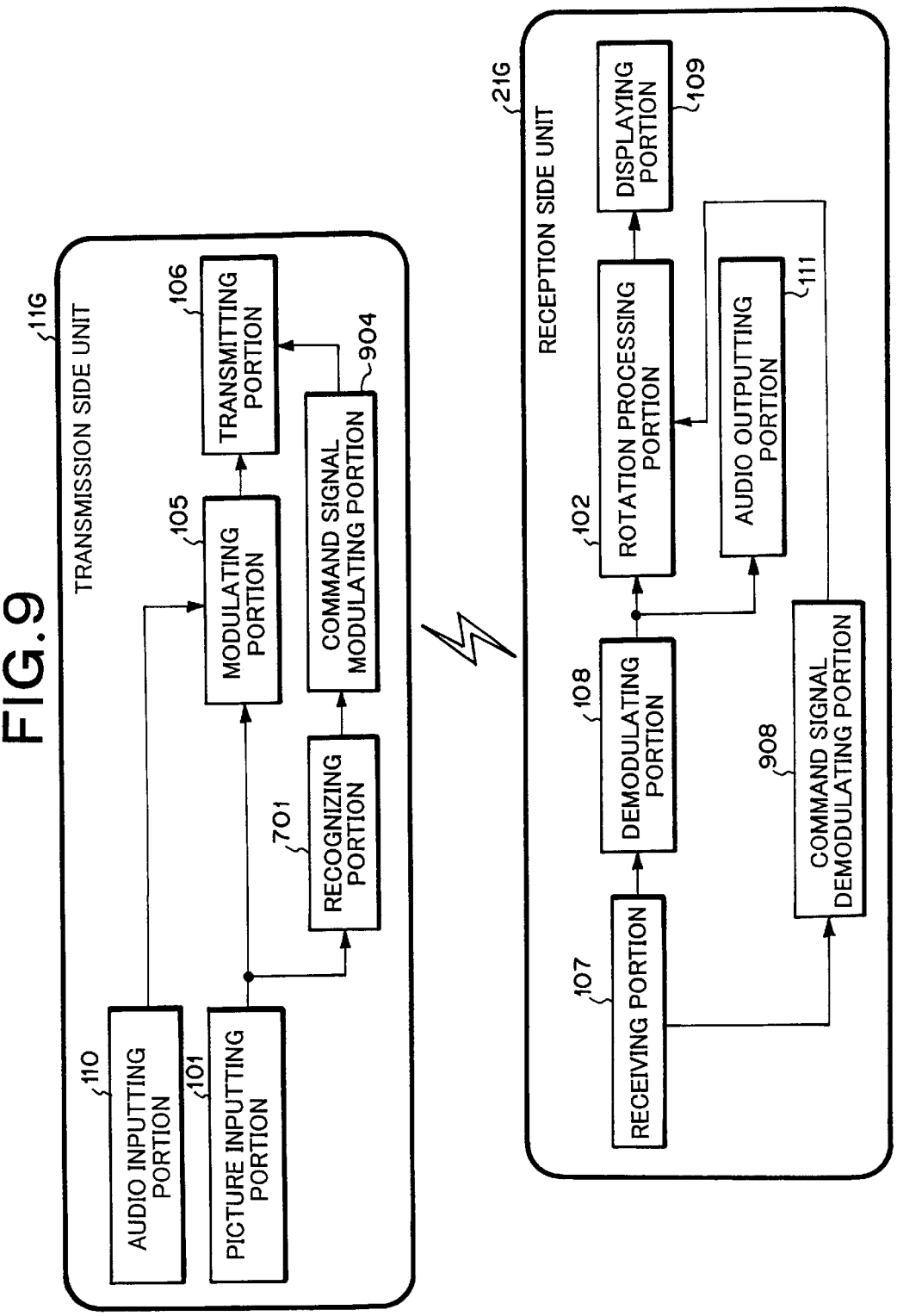
FIG. 9 is a block diagram showing the internal structure of a visual telephone conference system according to a seventh embodiment of the present invention.

FIG. 9 is a block diagram showing the internal structure of a visual telephone conference system according to the seventh embodiment of the present invention. The visual telephone conference system according to the seventh embodiment comprises a transmission side unit 11G as the transmission side unit 11 and a reception side unit 21G as the reception side unit 21.

The transmission side unit 11G comprises an audio inputting portion 110, a picture inputting portion 101, a modulating portion 105, a transmitting portion 106, a recognizing portion 701, and a command signal modulating portion 904. The reception side unit 21G comprises a rotation processing portion 102, a receiving portion 107, a demodulating portion 108, a displaying portion 109, an audio outputting portion 111, and a command signal demodulating portion 908.

The audio inputting portion 110 comprises a microphone 51, an amplifier, and an A/D converter. The audio inputting portion 110 inputs a voice and outputs an digital audio signal of the voice to the modulating portion 105. The audio inputting portion 110 may further comprise a compressing portion that compresses the digital audio signal.

The picture inputting portion 101 comprises a camera 53, an amplifier, and an A/D converter. The picture inputting portion 101 inputs a picture and outputs a digital picture signal to the modulating portion 105 and the recognizing portion 701.

The recognizing portion 701 inputs the digital picture signal from the picture inputting portion 101, analyzes the digital picture signal, detects the rotation angle of the picture frame of the digital picture signal against an upright picture frame, and outputs a command signal corresponding to the rotation angle to the command signal modulating portion 904. The rotation processing portion 102 rotates the picture frame so that the rotation angle represented by the command signal becomes zero.

The modulating portion 105 modulates the digital audio signal that is input from the audio inputting portion 110 and the digital picture signal that is input from the picture inputting portion 101 corresponding to a predetermined modulating system and outputs the modulated digital audio signal and digital picture signal to the transmitting portion 106.

The command signal modulating portion 904 modulates the command signal that is input from the recognizing portion 701 corresponding to a predetermined modulating system and outputs the modulated command signal to the transmitting portion 106.

The transmitting portion 106 comprises an amplifier and an antenna. The transmitting portion 106 amplifies the modulated digital audio signal and digital picture signal that are input from the modulating portion 105 and the modulated command signal that is input from the command signal modulating portion 904 and transmits the amplified signals as a radio signal to a base station (not shown) that manages the transmission side unit 11G. The radio signal that is received by the base station is transmitted to the reception side unit 21G through an exchange and the base station that manages the reception side unit 21G.

The receiving portion 107 comprises an antenna and an amplifier. The receiving portion 107 receives the radio signal that is transmitted from the transmission side unit 11G and outputs modulated digital audio signal and digital picture signal to the demodulating portion 108. In addition, the receiving portion 107 outputs the modulated command signal to the command signal demodulating portion 908.

The demodulating portion 108 demodulates the modulated digital audio signal and digital picture signal that are input from the receiving portion 107. The demodulating portion 108 outputs a demodulated digital audio signal to the audio outputting portion 111. In addition, the demodulating portion 108 output a demodulated digital picture signal to the rotation processing portion 102.

The command signal demodulating portion 908 demodulates the command signal that is input from the receiving portion 107 and outputs the demodulated command signal to the rotation processing portion 102.

The rotation processing portion 102 comprises a frame memory and a rotating circuit. The digital picture signal that is input from the demodulating portion 108 is stored in the frame memory. The digital picture signal stored in the frame memory is compensated by the rotating circuit corresponding to a command signal received from the command signal demodulating portion 908 so that the picture frame is rotated. The compensated digital picture signal is output to the displaying portion 109. The rotating circuit may be composed of a CPU or a DSP.

The displaying portion 109 comprises a D/A converter, a liquid crystal display driver, and a liquid crystal display 55. The picture inputting portion 101 inputs the digital picture signal from the rotation processing portion 102. When necessary, the displaying portion 109 displays a picture frame whose rotation angle is compensated around the perpendicular line that passes through the picture frame by the rotation processing portion 102.

The audio outputting portion 111 comprises a D/A converter, an amplifier, and a speaker 52. The audio outputting portion 111 outputs a voice that is input from the audio inputting portion 110 corresponding to a digital audio signal that is input from the demodulating portion 108.

Next, the detection of the rotation angle of the picture frame corresponding to the digital picture signal against the upright picture frame by the recognizing portion 701 will be described.

Since the picture frame contains a picture of a face, the angle of the picture of the face in the picture frame is detected. As a result, the rotation angle is detected. For example, an inverse isosceles triangle formed by both the eyes and the mouth of the face of the picture is extracted. The angle of the base of the inverse isosceles triangle against the horizontal line is defined as the rotation angle. Since the areas of the eyes move due to their blinking, such two areas are recognized as eye areas by a picture signal process. In addition, when a person speaks, the mouth moves more quickly and largely than other face portions. Thus, such an area is recognized as a mouth area by a picture signal process. The center points of the two eye areas and the mouth area are connected to form the inverse isosceles triangle.

The picture frame is rotated using the affine transformation. In the affine transformation, when the two-dimensional coordinate of a particular point that has not been rotated is denoted by (X, Y), the coordinate of the rotating axis is denoted by (A, B), and the rotation angle is denoted by θ, the two-dimensional coordinate of the point that has been rotated is expressed as follows:

$$X'=\cos\theta\times(X-A)+\sin\theta\times(Y-B)+A$$

$$Y'=-\sin\theta\times(X-A)+\cos\theta\times(Y-B)+B$$

The rotating circuit of the rotation processing portion 102 manipulates the addresses of the picture signal stored in the frame memory corresponding to the affine transformation. For example, the read addresses of the digital picture signal written in the frame memory are controlled corresponding to the above-described expressions.

The coordinate of the rotating axis (A, B) is set at the center point of the picture frame.

The rotation angle of the picture frame around the perpendicular line that passes through the picture frame may be compensated by a signal process of the rotation processing portion in the transmission side unit 11 corresponding to the automatically recognized result in the reception side unit 21.

Eighth Embodiment

The eighth embodiment of the present invention is a modification of the picture recognition of each of the fifth to seventh embodiment of the present invention.

According to the fifth to seventh embodiments, the rotation angle of the picture frame that is input from the picture inputting portion 101 against the upright picture frame is detected by a picture recognition of the eyes and the mouth of a face in a picture. However, according to the eighth embodiment of the present invention, the rotation angle is detected in the following manner.

Figure 10:
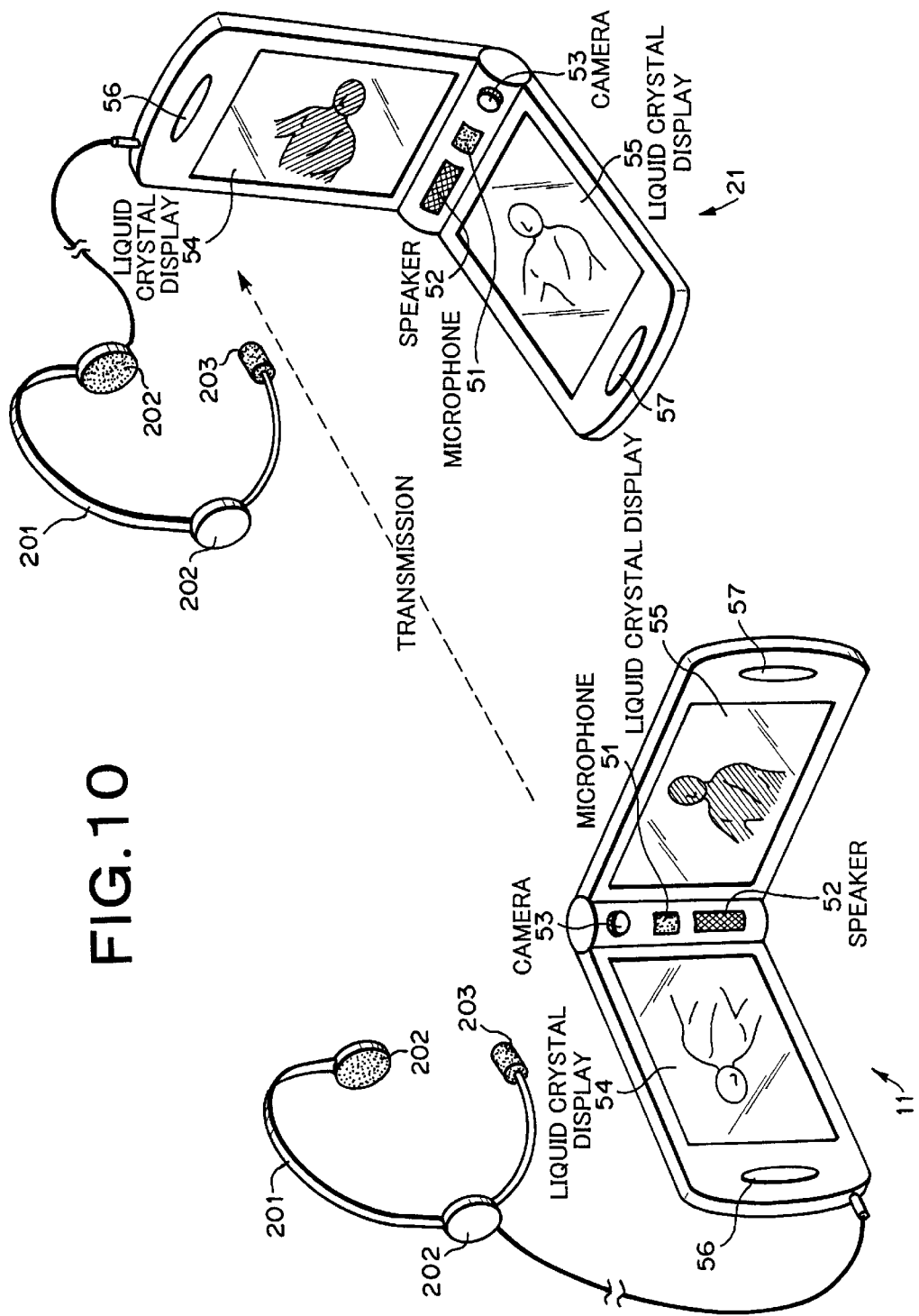
FIG. 10 is a schematic diagram showing an external view of a visual telephone conference system according to an eighth embodiment of the present invention.

As shown in FIG. 10, a head set 201 is connected to the transmission side unit 11. In addition, another head set 201 is connected to the reception side unit 21, because the reception side unit 21 also functions as the transmission side unit 11.

First light sources are disposed in speaker portions 202 of the head set 201. A second light source is disposed in a microphone portion 203 of the head set 201. The first light source is for example an infrared ray light source having a first predetermined wavelength. The second light source is for example an infrared ray light source having a second predetermined wavelength. It is necessary to cause the intensities of infrared rays of those light sources to be stronger than the intensity of infrared ray radiated from the human body.

The picture inputting portion 101 further comprises a filter that passes infrared rays as well as three types of filters that pass visible light rays. In addition, the picture inputting portion 101 further comprises an image pickup device that receives infrared rays as well as three image pickup devices that receive visible rays.

The recognizing portion 701 detects the positions of the first light sources and the second light source corresponding to a digital picture signal received from the infrared ray image pickup device, extracts an inverse isosceles triangle from the positions of the two first light sources and the position of the one second light source, and obtains the rotation angle of the picture frame that is input from the picture inputting portion 101 against the upright picture frame corresponding to the slope of the base of the inverse isosceles triangle.

Although the present invention has been shown and described with respect to the best mode embodiment thereof, it should be understood by those skilled in the art that the foregoing and various other changes, omissions, and additions in the form and detail thereof may be made therein without departing from the spirit and scope of the present invention.

What is claimed is:

1. A visual telephone unit, comprising:
   first inputting means for inputting a picture frame;
   second inputting means for inputting a compensation amount of a rotation angle of the picture frame around a perpendicular line that passes through the picture frame; and
   rotating means for rotating the picture frame by the compensation amount.

2. A visual telephone unit, comprising:
   first inputting means for inputting a picture frame;
   second inputting means for inputting a compensation amount of a rotation angle of the picture frame around a perpendicular line that passes through the picture frame; and
   rotating means for rotating said first inputting means by the compensation amount.

3. A visual telephone unit, comprising:
   first inputting means for inputting a picture frame;
   detecting means for detecting a rotation angle of the picture frame around a perpendicular line that passes through the picture frame against an upright picture thereof; and
   rotating means for rotating the picture frame so that the rotation angle becomes zero.

4. The visual telephone unit as set forth in claim 3,
   wherein said detecting means designates the angle made by the base of an inverse isosceles triangle formed by connecting both the eyes and the mouth of a face in a recognized picture and the horizontal line as the rotation angle.

5. The visual telephone unit as set forth in claim 3, further comprising:
   a head set having two speaker portions and a microphone portion each having a light source,
   wherein said detecting means designates the angle made by the base of an inverse isosceles triangle formed by connecting the light sources in the picture frame and the horizontal line as the rotation angle.

6. A visual telephone unit, comprising:
   receiving means for receiving a picture frame;
   inputting means for inputting a compensation amount of a rotation angle of the picture frame around a perpendicular line that passes through the picture frame; and
   rotating means for rotating the picture frame by the compensation amount.

7. A visual telephone unit, comprising:
   receiving means for receiving a picture frame;
   detecting means for detecting a rotation angle of the picture frame around a perpendicular line that passes through the picture frame against an upright picture thereof; and
   rotating means for rotating the picture frame so that the rotation angle becomes zero.

8. The visual telephone unit as set forth in claim 7,
   wherein said detecting means designates the angle made by the base of an inverse isosceles triangle formed by connecting both the eyes and the mouth of a face in a recognized picture and the horizontal line as the rotation angle.

9. The visual telephone unit as set forth in claim 7, further comprising:
   a head set having two speaker portions and a microphone portion each having a light source,
   wherein said detecting means designates the angle made by the base of an inverse isosceles triangle formed by connecting the light sources in the picture frame and the horizontal line as the rotation angle.

10. A visual telephone system having a first visual telephone unit and a second visual telephone unit;
    wherein the first visual telephone unit comprises:
    inputting means for inputting a picture frame;
    receiving means for receiving a compensation amount of a rotation angle of the picture frame around a perpendicular line that passes through the picture frame from the second visual telephone unit; and
    rotating means for rotating the picture frame by the compensation amount, and
    wherein the second visual telephone unit comprises:
    inputting means for inputting the compensation amount; and
    transmitting means for transmitting the compensation amount to the first visual telephone unit.

11. A visual telephone system having a first visual telephone unit and a second visual telephone unit;
    wherein the first visual telephone unit comprises:
    inputting means for inputting a picture frame;
    receiving means for receiving a compensation amount of a rotation angle of the picture frame around a perpendicular line that passes through the picture frame from the second visual telephone unit; and rotating means for rotating said inputting means by the compensation amount, and wherein the second visual telephone unit comprises:

inputting means for inputting the compensation amount; and transmitting means for transmitting the compensation amount to the first visual telephone unit.

12. A visual telephone system having a first visual telephone unit and a second visual telephone unit;

wherein the first visual telephone unit comprises:

inputting means for inputting a picture frame;

receiving means for receiving a rotation angle of the picture frame around a perpendicular line that passes through the picture frame against an upright picture thereof from the second visual telephone unit; and rotating means for rotating the picture frame so that the rotation angle becomes zero, and wherein the second visual telephone unit comprises:

detecting means for detecting the rotation angle; and transmitting means for transmitting the rotation angle to the first visual telephone unit.

13. The visual telephone system as set forth in claim 12, wherein said detecting means designates the angle made by the base of an inverse isosceles triangle formed by connecting both the eyes and the mouth of a face in a recognized picture and the horizontal line as the rotation angle.

14. The visual telephone system as set forth in claim 12, further comprising:

a head set having two speaker portions and a microphone portion each having a light source, wherein said detecting means designates the angle made by the base of an inverse isosceles triangle formed by connecting the light sources in the picture frame and the horizontal line as the rotation angle.

15. A visual telephone system having a first visual telephone unit and a second visual telephone unit;

wherein the first visual telephone unit comprises:

first inputting means for inputting a picture frame;

second inputting means for inputting a compensation amount of a rotation angle of the picture frame around a perpendicular line that passes through the picture frame; and transmitting means for transmitting the compensation amount to the second visual telephone unit, and wherein the second visual telephone unit comprises:

receiving means for receiving the compensation amount from the first visual telephone unit; and rotating means for rotating the picture frame by the compensation amount.

16. A visual telephone system having a first visual telephone unit and a second visual telephone unit;

wherein the first visual telephone unit comprises:

inputting means for inputting a picture frame;

detecting means for detecting a rotation angle of the picture frame around a perpendicular line that passes through the picture frame against an upright picture thereof; and transmitting means for transmitting the rotation angle to the second visual telephone unit, and wherein the second television unit comprises:

receiving means for receiving the rotation angle from the first visual telephone unit; and rotating means for rotating the picture frame so that the rotation angle becomes zero.

17. The visual telephone system as set forth in claim 16, wherein said detecting means designates the angle made by the base of an inverse isosceles triangle formed by connecting both the eyes and the mouth of a face of a recognized picture and the horizontal line as the rotation angle.

18. The visual telephone system as set forth in claim 16, further comprising:

a head set having two speaker portions and a microphone portion each having a light source, wherein said detecting means designates the angle made by the base of an inverse isosceles triangle formed by connecting the light sources of the picture frame and the horizontal line as the rotation angle.

19. A visual telephone unit, comprising:

a camera, wherein the camera inputs a picture frame;

an operator interface, wherein a compensation amount of a rotation angle of the picture frame around a perpendicular line that passes through the picture frame is an input; and a processor, wherein the processor rotates the picture frame by the compensation amount using affine transformation.

* * * * *